United States Patent
Olarig et al.

(10) Patent No.: US 6,895,456 B2
(45) Date of Patent: May 17, 2005

(54) SYSTEM SUPPORTING MULTICAST MASTER CYCLES BETWEEN DIFFERENT BUSSES IN A COMPUTER SYSTEM

(75) Inventors: Sompong P. Olarig, Cypress, TX (US); Thomas J. Bonola, Magnolia, TX (US); Ramkrishna V. Prakash, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 609 days.

(21) Appl. No.: 09/735,267

(22) Filed: Dec. 12, 2000

(65) Prior Publication Data

US 2002/0108012 A1 Aug. 8, 2002

Related U.S. Application Data (63) Continuation-in-part of application No. 09/203,093, filed on Dec. 10, 1998.

(51) Int. Cl.$^7$ .................................................. G06F 3/00
(52) U.S. Cl. ........................................ 710/100; 710/21
(58) Field of Search ................................. 710/306–315

(56) References Cited

U.S. PATENT DOCUMENTS

| | | | | |
|---|---|---|---|---|
| 5,367,695 A | * | 11/1994 | Narad et al. | 709/210 |
| 5,461,723 A | * | 10/1995 | Shah et al. | 710/113 |
| 5,511,165 A | * | 4/1996 | Brady et al. | 709/216 |
| 5,511,224 A | * | 4/1996 | Tran et al. | 710/306 |
| 5,572,734 A | * | 11/1996 | Narad et al. | 710/200 |
| 5,634,138 A | * | 5/1997 | Ananthan et al. | 710/21 |
| 5,655,112 A | * | 8/1997 | MacInnis | 345/501 |
| 5,933,613 A | * | 8/1999 | Tanaka et al. | 710/314 |
| 6,097,403 A | * | 8/2000 | McMinn | 345/519 |
| 6,122,690 A | * | 9/2000 | Nannetti et al. | 710/311 |
| 6,230,228 B1 | * | 5/2001 | Eskandari et al. | 710/310 |
| 6,260,093 B1 | * | 7/2001 | Gehman et al. | 710/309 |
| 6,567,871 B2 | * | 5/2003 | Koh et al. | 710/110 |

FOREIGN PATENT DOCUMENTS

EP  628916 A1 * 12/1994  ........... G06F/13/42

OTHER PUBLICATIONS

PCI System Architecture Thire edition 1995 p. 312.*

\* cited by examiner

*Primary Examiner*—Paul R. Myers (57) ABSTRACT

A computer system with a plurality of peripheral busses is adapted to permit multicast signals to be transmitted by a device on one peripheral bus to multiple devices on the other peripheral bus. In an exemplary embodiment, two PCI busses are provided, and master devices on either bus are capable of transmitting multicast signals to multiple targets on either bus. Targets of a multicast cycle are identified by a target identification signal on a first and a second multicast bus. A bus bridge relays the data for the multicast cycle between devices. In an exemplary embodiment, a sideband signal from the master to the bridge indicates a multicast signal has been transmitted on one of the PCI busses. In response, the bridge relays the multicast data to the second PCI bus, while also transmitting a sideband signal to devices on the second bus indicating multicast data is being transmitted on that bus. Targets identified on the second bus then capture the multicast data.

24 Claims, 5 Drawing Sheets

SYSTEM SUPPORTING MULTICAST MASTER CYCLES BETWEEN DIFFERENT BUSSES IN A COMPUTER SYSTEM

CROSS-REFERENCE TO RELATED APPLICATIONS

This application is a continuation-in-part of U.S. Ser. No. 09/203,093, filed Dec. 10, 1998.

STATEMENT REGARDING FEDERALLY SPONSORED RESEARCH OR DEVELOPMENT

Not applicable.

BACKGROUND OF THE INVENTION

1. Field of the Invention

The present invention generally relates to the transfer of data in a computer system. More particularly, the present invention relates to transferring data between multiple computer busses. Still more particularly, the present invention relates to a system in which data may be broadcast from a bus master device on one computer bus to multiple target devices on a different bus.

2. Background of the Invention

Computer systems have achieved wide usage in modem society. During operation, a computer system processes and stores data at a speed and at a level of accuracy many times that which can be performed manually. Successive generations of computer systems have permitted increasingly large amounts of data to be processed at faster rates.

Computer systems are sometimes operated as stand-alone devices or connected together by way of network connections, typically together with a network server, to form a computer network. When networked together, communication between the separate computer systems is possible. Files and other data stored or generated at one computer system can be transferred to another computer system.

A conventional computer system typically includes one or more Central Processing Units (CPUs) capable of executing software applications, and a computer main memory. Peripheral devices, both those embedded together with a CPU or constructed to be separate therefrom, also typically form part of a conventional computer system. Computer peripheral devices include, for instance, video graphics adapters, Local Area Network (LAN) interfaces, Small Computer System Interface (SCSI) bus adapters, and mass storage devices, such as disk drive assemblies.

A computer system further typically includes computer buses which permit communication of data between various components of the computer system. For example, a host bus, a memory bus, a local peripheral expansion bus, and one or more additional peripheral buses form portions of a typical computer system. A peripheral bus may comprise, for example, a Small Computer Systems Interface (SCSI) bus, an Extension to Industry Standard Architecture (EISA) bus, an Industry Standard Architecture (ISA) bus, or a Peripheral Component Interface (PCI) bus. The peripheral bus forms a communication path to and from one or more peripheral devices connected thereto. The peripheral bus typically links the peripheral devices to a bus bridge, which in turn couples to the CPU.

The computer operates by having data flow through the system, with modification of the data occurring frequently. Traditionally, the CPU controlled most activities in the computer system. The CPU supervises data flow and is responsible for most of the high-level data modification in the computer. The CPU, therefore, is the "heart" of the system and receives signals from the peripheral devices, reads and writes data to memory, processes data, and generates signals controlling the peripheral devices.

Despite the importance of the processor, the performance of the computer system is determined only in part by the speed and efficiency of the processor. Other factors also affect system performance. One of the most critical factors is the bus that interconnects the various system components. The size and clock speed of the bus dictate the maximum amount of data that can be transmitted between components. Early bus systems, such as the ISA (Industry Standard Architecture) bus, required that all components communicate through the CPU. The ISA bus was a bus standard adopted by computer manufacturers to permit the manufacturers of peripheral devices to design devices that would be compatible with most computer systems.

Since the introduction of the ISA bus, computer technology has continued to evolve at a relatively rapid pace. New peripheral devices have been developed, and processor speeds and the size of memory arrays have increased dramatically. In conjunction with these advances, designers have sought to increase the ability of the various system busses to transfer more data at a faster speed. One way in which the system busses have been made more efficient is to permit data to be exchanged in a computer system without the assistance of the CPU. To implement this design, however, a new bus protocol had to be developed. One of the first such buses that permitted peripheral devices to run master cycles independently of the CPU was the EISA (Extended Industry Standard Architecture) bus. The EISA bus enables various system components residing on the EISA bus to obtain mastership of the bus and to run cycles on the bus.

More recently, the Peripheral Component Interconnect (PCI) bus has become increasingly popular. Like the EISA bus, the PCI bus has bus master capabilities, and thus certain master components residing on the PCI bus may communicate directly with other PCI components by addressing read and write commands to these other components based on protocols defined in the PCI Specification, which has been jointly developed by companies in the computer industry. Because of the bus mastering capabilities and other advantages of the PCI bus, many computer manufacturers now implement the PCI bus as one of the primary expansion busses in the computer system.

As one skilled in the computer art will appreciate, computer peripheral devices originate from numerous manufacturers. Thus, it is commonplace for a computer system to include a CPU from one manufacturer, with a variety of peripheral devices that originate from other manufacturers. Furthermore, the software platform for the computer system may comprise any of several different operating systems. Software drivers typically are required for each computer peripheral device to effectuate its operation. A software driver must be specifically tailored to operate in conjunction with the particular operating system operating on the computer. A multiplicity of software drivers might have to be created for a single computer peripheral to ensure that device is operable with any of the different possible operating systems that may be used as the software platform for the computer system.

The complexity resulting from such a requirement has led, at least in part, to the development of an Intelligent Input/Output ($I_2O$) standard specification. The $I_2O$ standard specification sets forth, inter alia, standards for an I/O device driver architecture that is independent of both the specific peripheral device being controlled and the operating system of the computer system to which the device driver is to be installed. In the I$_2$O standard specification, the portion of the driver that is responsible for managing the peripheral device is logically separated from the specific implementation details of the operating system with which it is to be installed. Because of this, the part of the driver that manages the peripheral device is portable across different computer and operating systems. The I$_2$O standard specification also generalizes the nature of communications between the host computer system and peripheral hardware; thus, providing processor and bus technology independence.

Regardless of which bus protocol is deployed in a computer system or whether the computer system is I$_2$O compliant, devices frequently employ bus master/slave functionality to communicate across a computer system bus. In a typical bus transaction, a single bus master sends information, including, but not limited to, address, data and control information to a single target device operating as a slave during that bus transaction. In certain situations, however, it is desirable to broadcast the information to multiple targets. For example, in a fault-tolerant environment it is desirable to perform fast backup of data such as by providing mirrored disk drives. Conventional methods for broadcasting information to multiple targets requires moving the information multiple times using multiple bus transactions.

It would be advantageous therefore, to devise a method and apparatus, which would effectuate low-latency distribution of data to multiple devices. It would further be advantageous if such a method and apparatus provided multicasting on a computer system bus wherein information from a single bus master is broadcast to multiple targets during a single bus transaction.

In addition, it also would be desirable if broadcast cycles could be performed across different busses, without requiring the cycles to be relayed to each target device by the bus bridge. Currently, a master on a first bus must target the bus bridge, which operates as a slave device. Once the bus bridge receives the cycle, the bus bridge operates as a master on the second bus bridge to relay the cycle to a target on the second bus. This process must be repeated for each target on the second bus. This repetitive process of relaying signals can degrade performance on both busses. In computer systems that implement multiple peripheral or system busses, coupled together by bridges, it would be desirable if a master on one bus could transmit multicast cycles to all targeted devices on any bus by having the bridge relay the multicast signal a single time. The ability to broadcast messages to multiple devices on different busses would further reduce system latency that would otherwise result if cycles must be repeated to each target.

SUMMARY OF THE INVENTION

The present invention comprises a method and apparatus for broadcasting data to multiple target devices during a single bus transaction. Each of a plurality of potential target devices detect the beginning of a primary bus transaction and retrieve transaction command and target device identification information from a multicast bus. The transaction command information and target device identification information are decoded. A determination is made by each device as to whether the decoded target device identification information matches the identity of the device and furthermore whether the decoded transaction command is a command that can be implemented in a multicast mode. If the target device identification information matches the identity of the device and the command is a type that supports multicasting, the device accepts data present on the bus, or drives out data onto the bus at an appropriate time.

According to the preferred embodiment of the present invention, data may be broadcast from one bus to another via a bus bridge. Thus, a master on one bus may initiate a multicast cycle to targets on a second bus. The targets on the second bus are identified by target identification signals on a multicast bus. In addition, the bridge is notified of a multicast cycle by one or more sideband signals that are received from the master device. The bridge responds to the sideband signals by relaying multicast data to the other bus. When the data is transmitted on the second bus by the bridge, the bridge also preferably transmits a sideband signal to all devices resident on the second bus indicating that multicast data is available for capturing by targets on that bus, as identified by the target identification signal.

BRIEF DESCRIPTION OF THE DRAWINGS

A more complete understanding of the present invention may be had by reference to the following Detailed Description and appended claims, when taken in conjunction with the accompanying Drawings wherein:

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The term "multicasting" means the ability to transmit or broadcast instructions or data to multiple targets. To the extent that any term is not specially defined in this specification or claims, the intent is that the term is to be given its plain and ordinary meaning.

DETAILED DESCRIPTION OF THE PREFERRED EMBODIMENTS

Figure 1:
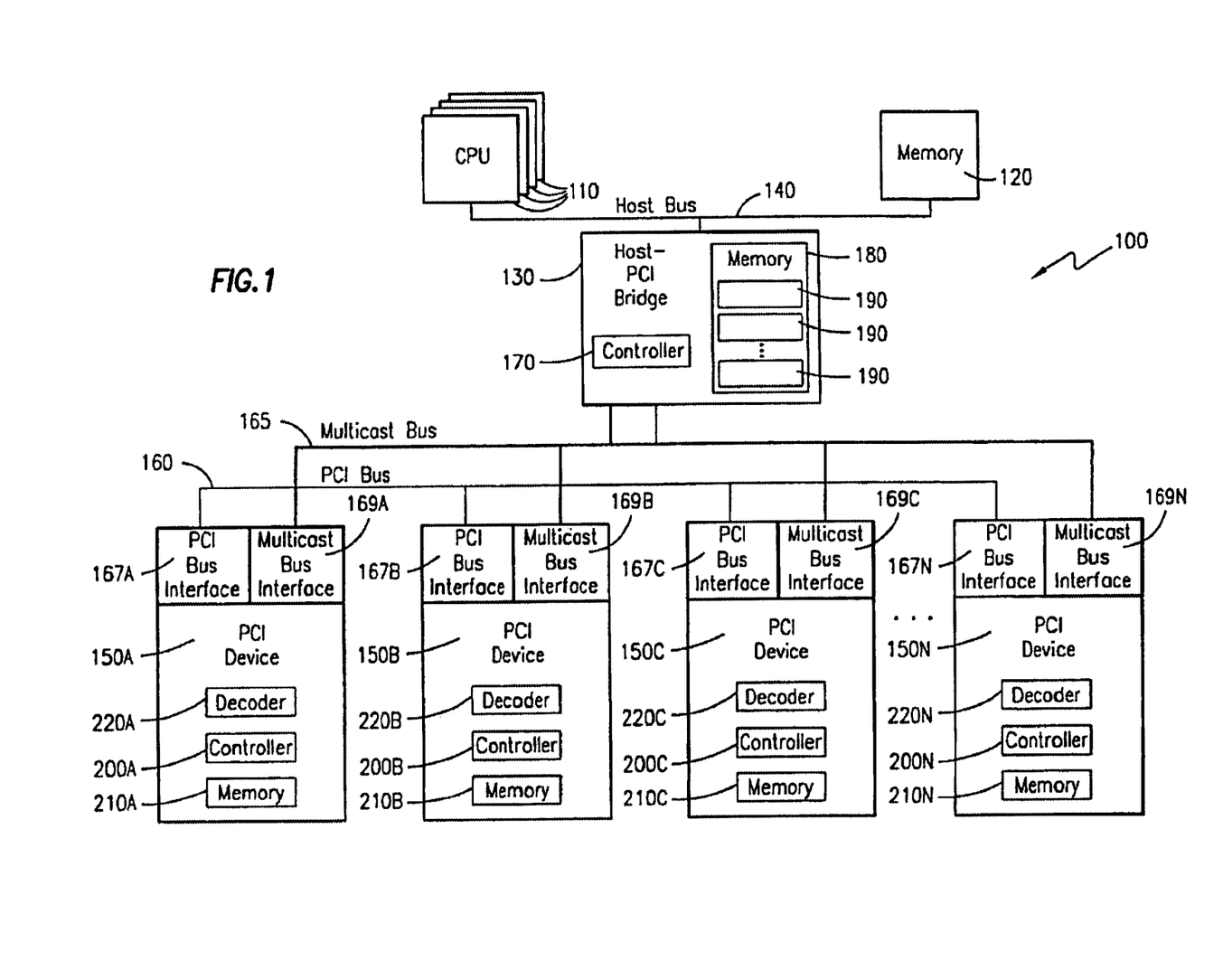
FIG. 1 is a functional block diagram of an apparatus for effectuating multicasting on a computer system bus.

Referring now to FIG. 1, there is illustrated a computer system, shown generally at 100, that supports multicasting on a computer system bus. A plurality of host CPUs 110, a host memory 120, a host-to-PCI bridge 130 and other devices (not shown) typically associated with a host computer system communicate with one another across a host bus 140. The host-to-PCI bridge 130 and a plurality of PCI devices 150A-N communicate with one another across a PCI bus 160. The PCI devices 150A-N can be located on a mother board together with the host CPUs 110 or can be located off of the mother board separate from the host CPUs 110 in one or more PCI bus slots, in accordance with normal convention. Communication between devices on the host bus 140 and devices on the PCI bus 160 is effectuated via the host-to-PCI bridge 130 in a manner well known in the industry. Furthermore, as will be described in greater detail, information is broadcast from devices on the host bus 140, for example the host CPU 110, to multiple PCI devices 150A-N across the PCI bus 160 via the host-to-PCI bridge 130 in conjunction with a multicast bus 165. The host-to-PCI bridge 130 is controlled by a controller 170 and includes a memory 180, which preferably includes a plurality of configuration registers 190.

Each PCI device 150A-N includes a PCI bus interface 167A-N and a multicast bus interface 169A-N for interfacing to the PCI bus 160 and the multicast bus 165, respectively. Each PCI device 150A-N is controlled by an associated controller 200A-N and typically includes an associated memory 210A-N. Command information and target identification information communicated across the multicast bus 165 to the PCI devices 150A-N preferably is decoded by the PCI devices 150AN using an associated decoder 220A-N.

Figure 2:
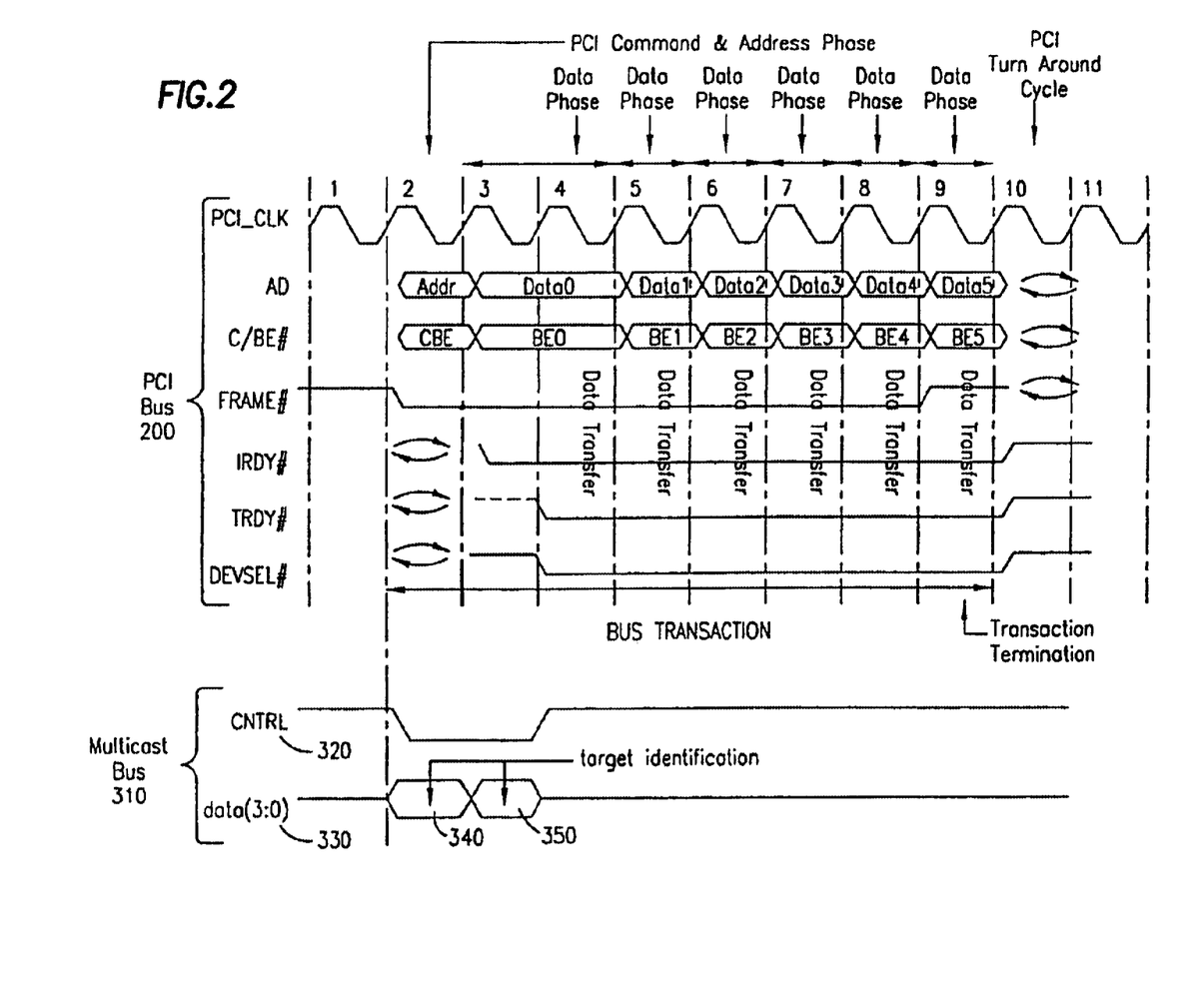
FIG. 2 is a timing diagram for effectuating multicasting on a computer system bus consistent with the apparatus described in FIG. 1.

Referring additionally now to FIG. 2, there is illustrated a timing diagram for effectuating multicasting on a computer system bus consistent with the computer system 100 described in FIG. 1. FIG. 2 illustrates signals 200 associated with a PCI bus write data transaction and signals 310 associated with the multicast bus 165 to effectuate multicasting of the data which is the subject of the data write transaction. The signals 200 associated with the PCI bus 165 are synchronous with the signals 310 of the multicast bus 165 as depicted in FIG. 2.

In the preferred embodiment of the present invention, the multicast bus 310 comprises a control signal (CNTRL) 320 and four data lines (data (3:0)) 330. A transition of the control signal (CNTRL) 320 from a high state to a low state indicates the beginning of a bus transaction, and the four data lines (data (3:0)) 330 during a multicast bus command cycle identify a command 340 which is to be performed followed by a target identification 350, present during a multicast bus target identification cycle, identifying one or more PCI device(s) 150A-N which are targets of the multicast cycle.

When the control signal (CNTRL) 320 transitions from a high state to a low state each of the PCI devices 150A-N reads the command 340 from data lines (data (3:0)) 330. On the subsequent clock cycle each PCI device 150A-N reads the target identification 350 from data lines (data (3:0)) 330. The associated decoder 220A-N of each PCI device 150A-N decodes the command 340 and the target identification 350. If the decoded command 340 is a write operation and the decoded target identification 350 matches the identity of the particular PCI device 150A-N, the particular PCI device 150A-N reads the data present on the PCI bus 160 during the appropriate data phases of the PCI bus transaction. The target identification 350 can identify a single PCI device or, by designing the decoders 220A-N to recognize a range of PCI devices identities, the target identification 350 can identify more than one target PCI device 150A-N resulting in multiple devices reading the data from the PCI bus 160.

In an alternative embodiment, the control signal (CNTRL) 320 is eliminated and a transition from a high state to a low state of the Frame # signal on the PCI bus 160 is used to identify the beginning of a bus transaction. Furthermore, the number of data lines comprising (data (3:0)) 330 can be any number of data lines and need not be set to four data lines. Still further, each of the data lines comprising (data (3:0)) 330 can be associated with a particular command so that activation of the particular data line during a command phase is indicative of the particular command. Likewise, each of the data lines comprising (data (3:0)) 330 can be associated with a particular PCI device 150A-N so that activation of the particular data line or lines during a target identification phase indicates the particular PCI device(s) 150A-N which are the intended target(s). Such a dedicated use of the data lines (data (3:0)) eliminates the need for decoders 220A-N. While the preferred embodiment of the present invention describes the present invention as it applies to PCI devices on a PCI bus using PCI protocol, it is understood that the present invention is equally applicable to other types of devices on various types of busses using other protocols.

As an example of the implementation and use of the present invention, PCI device 150A is designated as an active PCI device and PCI device 150B is designated as a mirroring or failover device in a duplex configuration. In this configuration, the two PCI devices 150A-B are essentially identical. The Basic Input Output System (BIOS) sets up configuration registers 190 in the memory 180 of the host-to-PCI bridge 130. When a device on the host bus 140, for example the host CPU 110, needs to write data into PCI device 150A, the host-to-PCI bridge 130 activates both the multicast bus 165 and the PCI bus 160 simultaneously to inform the PCI device 150B to update the PCI data that is destined to PCI device 150A on the PCI bus 160. In this example, the bus bandwidth consumption is reduced by half since the host-to-PCI bridge 130 performs a single write transaction instead of having to perform separate write transactions to PCI device 150A and PCI device 150B.

In another example of the implementation and use of the present invention, PCI device 150A is designated as an active PCI device and PCI device 150B is designated as a fast backup device. In this configuration, the two PCI devices 150A-B are not the same. For example, PCI device 150A may comprise a disk controller while PCI device 150B is a tape controller. The BIOS sets up configuration registers 190 in the memory 180 of the host-to-PCI bridge 130. When a device on the host bus 140, for example the host CPU 110, needs to write data into PCI device 150A, the host-to-PCI bridge 130 activates both the multicast bus 165 and the PCI bus 160 simultaneously to inform the PCI device 150B to update the PCI data that is destined to PCI device 150A on the PCI bus 160. In this example, the bus bandwidth consumption is reduced by half since the host-to-PCI bridge 130 performs a single write transaction instead of having to perform separate write transactions to PCI device 150A and PCI device 150B. Furthermore, in this configuration, a system administrator dynamically backs up the system in real time and there is no need for system downtime to perform scheduled backups. In these examples, the Host-to-PCI bridge 130 initiates cycles on the multicast bus. It should be understood, however, that any master device may initiate multicast cycles.

Figure 3:
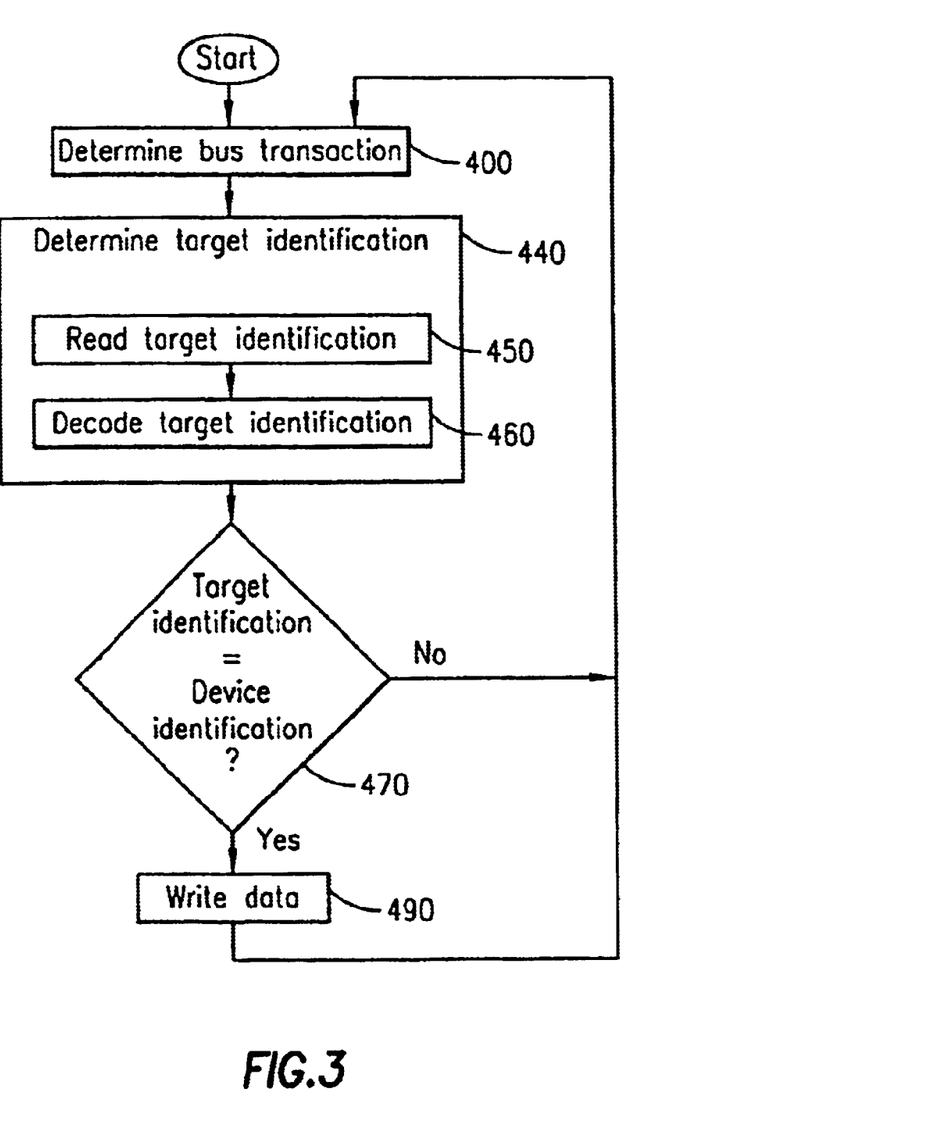
FIG. 3 is a flow diagram for effectuating multicasting on a computer system bus consistent with the apparatus described in FIG. 1 and the timing diagram described in FIG. 2.

Referring additionally now to FIG. 3, there is illustrated a flow diagram for effectuating multicasting on a computer system bus consistent with the apparatus described in FIG. 1 and the timing diagram described in FIG. 2. Each of the PCI devices 150A-N preferably detect the beginning of a bus transaction (step 400) and determine the transaction command 340. In the preferred embodiment, the PCI devices 150A-N determine the transaction command 340 by reading the transaction command 340 from the multicast bus 165 and decoding the transaction command 340.

The PCI devices 150A-N also determine the target identification (step 440) which in the preferred embodiment is accomplished by reading the target identification 350 (step 450) from the multicast bus 165 and decoding the target identification 350 (step 460). A determination then is made as to whether the decoded target identification 350 matches the identity of the particular PCI devices 150A-N (step 470) and if so, a determination is made as to whether the decoded command 340 is a write data command. If the decoded command 340 is a write data command then data is read from the PCI bus 160 and written into the particular PCI device 150A-N (step 490). If, in step 470, a determination is made that the target identification 350 does not match the identity of the particular PCI device 150A-N or if a determination is made that the command 340 is not a data write command, monitoring continues at step 400 to detect the beginning of a bus transaction.

As a further extension to the present invention, the computer system may be configured to permit multicast cycles to execute across multiple busses, and not just within a single peripheral bus. Thus, for example, where two busses have compatible protocols within the computer system, the present invention may be extended to permit cycles on one of the busses to be multicast to devices on the other bus. In the following discussion it will be assumed that two PCI busses are used in the computer system to illustrate the principles of the present invention. The present invention, however, should not be construed as limited to use with PCI busses or between busses that use identical protocols.

Figure 4:
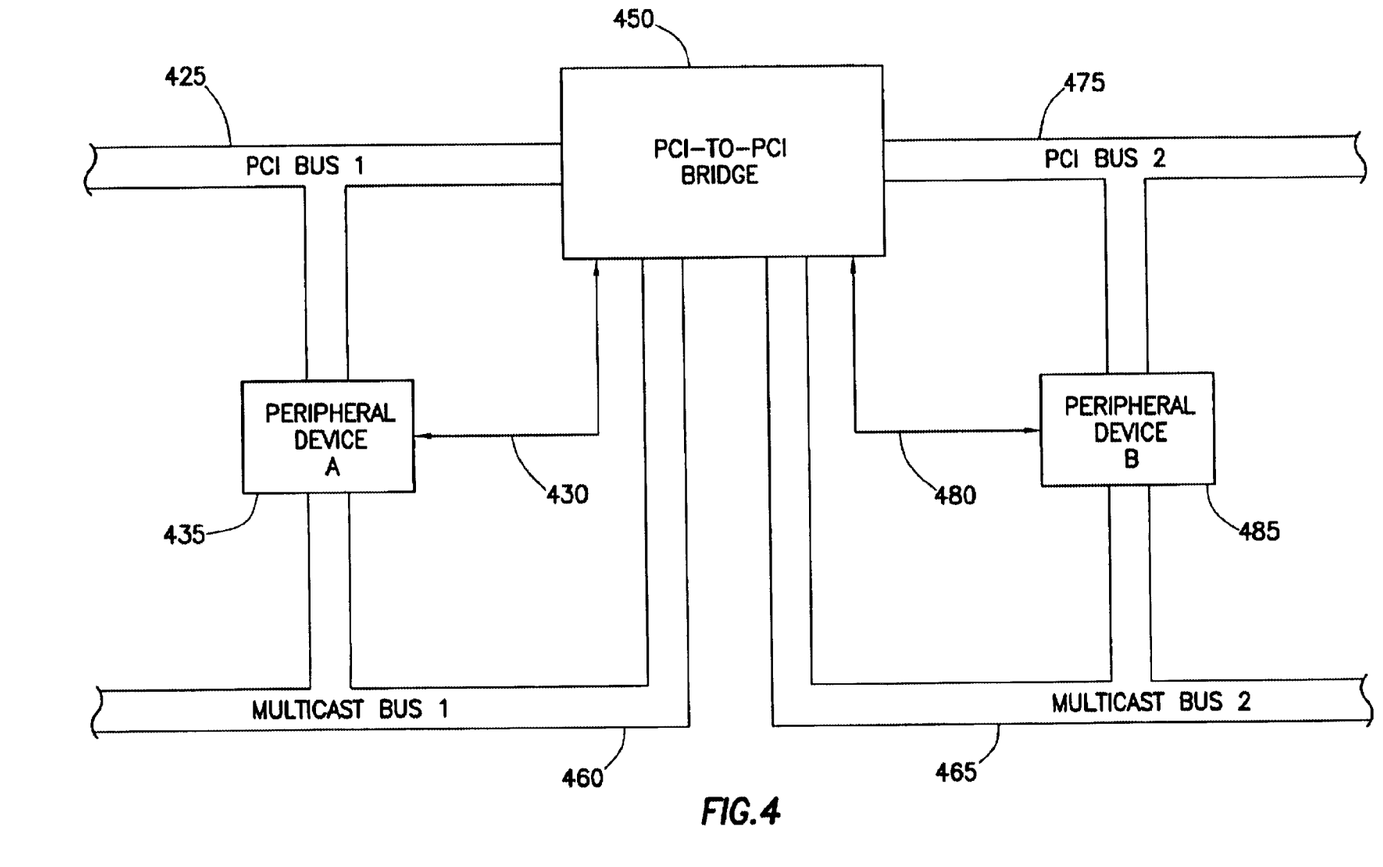
FIG. 4 is a functional block diagram that illustrates multicasting across two different compatible computer busses in accordance with one embodiment.

Referring now to FIG. 4, a portion of a computer system is shown that includes a first PCI bus 425, a second PCI bus 475, and a PCI-to-PCI bus bridge 450. The other components of the computer system, such as the CPU, host-to-PCI bridge, memory, and the like, have been omitted so as not to obfuscate the following discussion. Also shown in FIG. 4 is a first PCI device (Device A) 435 coupled to PCI bus 425, and a second PCI device (Device B) 485 coupled to PCI bus 475. Although only a single PCI device is shown coupled to each of the PCI busses 425, 475, respectively, it should be understood that additional PCI devices may couple to each of these busses, as shown for example in FIG. 1. A first multicast bus 460 preferably couples to each of the peripheral devices 435 of the first PCI bus 425, and to the PCI-to-PCI bridge 450, according to the teachings of FIG. 1. Similarly, a second multicast bus 465 couples to each of the peripheral devices of the second PCI bus 475, and to the PCI-to-PCI bridge 450. Thus, although not shown in FIG. 4, the first multicast bus 460 also preferably couples to the host-to-PCI bridge as well. Additional sideband signals preferably also are provided between the peripheral device 435 to the PCI-to-PCI bus 450, and between peripheral device 485 to PCI-to-PCI bus 450. These sideband signals are referenced as signals 430 and 480 in FIG. 4, respectively.

Referring still to FIG. 4, the system shown therein supports multicasting cycles across the PCI-to-PCI bus 450 to multiple device in a single transaction, without requiring repetitive cycles to each device. Thus, by way of illustration, assume peripheral device A 435 on PCI bus 425 transmits a broadcast message intended for multiple targets on PCI bus 475. Using the protocol discussed above in relation to FIGS. 1, 2 and 3, the master device (which in the example is device A 435) initiates a master cycle on the PCI bus 425 in accordance with normal convention, targeting the PCI-to-PCI bus 450. In addition, peripheral device 435 transmits the control and data signals on the multicast bus 460 identifying the start and type of multicast cycle, and the intended targets of the cycle. Thus, according to the preferred embodiment, each of the PCI devices on PCI busses 425, 475 is assigned a specific op code value. In addition, the PCI devices may be grouped in any desired way to permit broadcasting. Thus, for example, if four data lines (data(3:0)) are used with four PCI peripheral devices on each bus (Devices A0, A1, A2, A3 on bus 425 and Devices B0, B1, B2, B3 on bus 475), the following opcode values may be assigned to select the appropriate target device based on the value of the data signals:

| Data lines D(3:0) | device selected |
| --- | --- |
| 0000 | A0 |
| 0001 | A1 |
| 0010 | A2 |
| 0011 | A3 |
| 0100 | A0 and A2 |
| 0101 | A1 and A3 |
| 0110 | A1 and A2 |
| 0111 | A0, A1, A2, A3 |
| 1000 | B0 |
| 1001 | B1 |
| 1010 | B2 |
| 1011 | B3 |
| 1100 | B0 and B2 |
| 1101 | B1 and B3 |
| 1110 | B1 and B2 |
| 1111 | B0, B1, B2, B3 |

The above table is merely exemplary, and many other combinations may be used. For example, the data signals may be used only to indicate a multicast condition where multiple devices are targeted, with a single signal indicating that the busses should operate in normal fashion. Thus, for example, if the data signals produce a 0000 signal on the four data lines, this would indicate a single target, whose address is defined using the conventional PCI bus protocol. Consequently, according to one embodiment, the multicast target identification would only be used to identify targets of multicast cycles, and would not be used to identify the targets of conventional PCI cycles to a single target.

Although four data lines are identified in the preferred embodiment, additional data lines may be provided, or the data may be transmitted in packets using multiple clock signals. As indicated above, the data signals are capable of signaling individual targets on a bus, various combinations of devices as targets, all devices on bus 425 as a target, all devices on bus 475 as a target, and all devices on both busses as a target. Thus, the signals on the multicast bus indicate which of the devices are intended as targets and which need to decode the PCI cycle.

In addition, the sideband signals between the PCI devices and the PCI-to-PCI bus are used to indicate to the PCI-to-PCI bridge 450 that the transaction is a multicast cycle and has multiple targets on PCI bus 475. Thus, the sideband signals 430 between device A 435 and the PCI-to-PCI bridge 450 indicate to the PCI-to-PCI bridge that it must relay the current cycle as a multicast cycle on PCI bus 475. When the PCI-to-PCI bridge 450 relays the signal, it also indicates that multicast data is now available to the targeted devices on bus 475 by transmitting an appropriate signal to the targets via sideband signals 480 and by transmitting a target identification signal on the second multicast bus 465. Thus, by using the sideband signals 430, 480, timing issues may be minimized because the sideband signals may be used to indicate that the data is or will soon be available on the busses. Thus, a master device (such as Device A) runs a multicast cycle that is accepted by the PCI-to-PCI bridge 450 based on the transmission of a signal on the first sideband signals 430 indicating to the bridge that it is an inter-bus multicast cycle. The PCI-to-PCI bridge 450 then retransmits on the second bus 475, and also transmits a signal to the devices on the second bus via the sideband signals 480 and multicast bus 465, indicating the inter-bus multicast data is appearing on the second bus 475. At that time, the devices on the second bus, such as Device B, which are identified by the op code provided in the data lines (D3:0) of the multicast bus, decode the cycle. Various other techniques for resolving the timing issue may be used without departing from the principles of the present invention.

Figure 5:
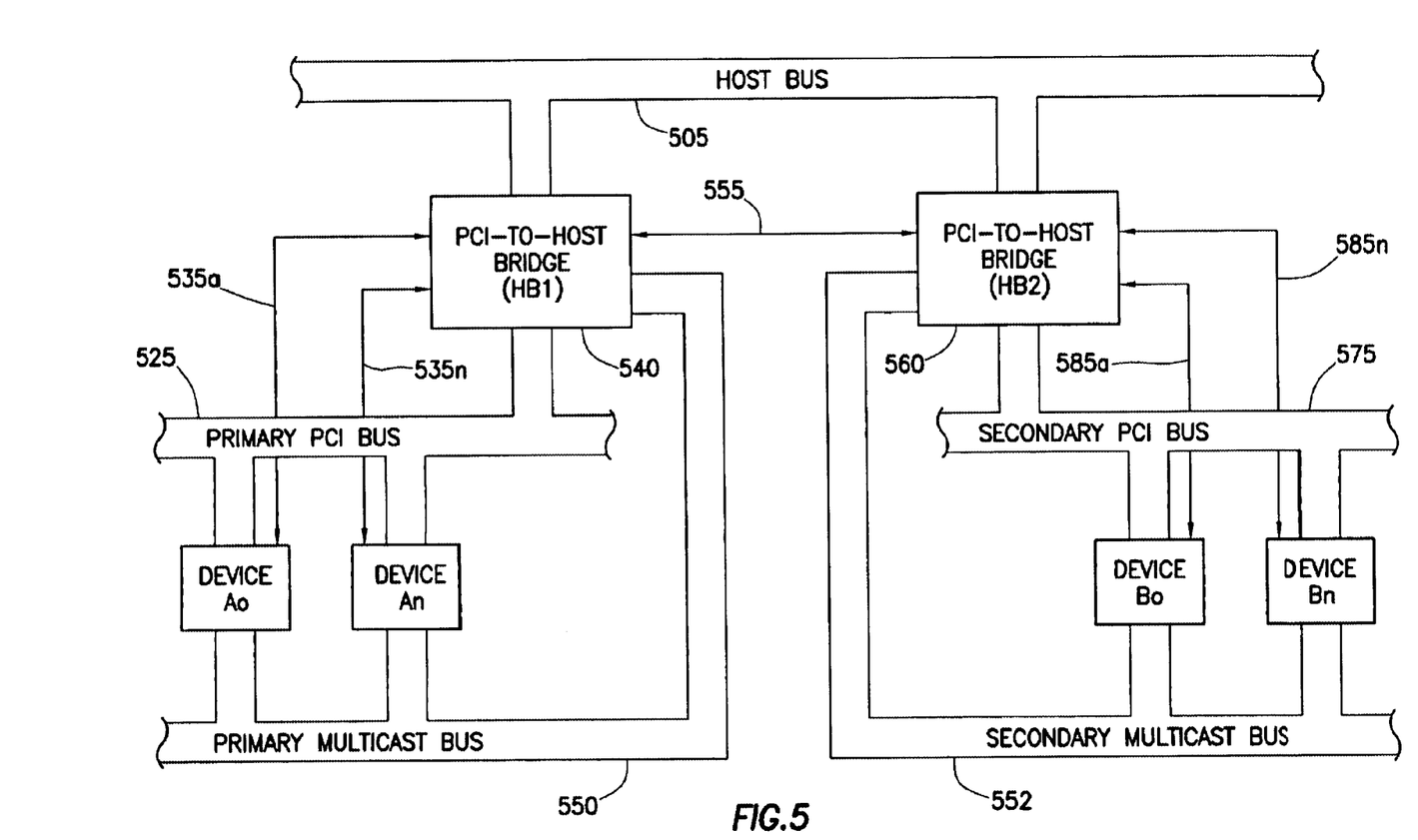
FIG. 5 is a functional block diagram that illustrates multicasting across two different compatible computer busses that are separated by other non-compatible busses, in accordance with a second embodiment.

Referring now to FIG. 5, part of a computer system is shown that includes a primary PCI bus 525, a secondary PCI bus 575, a first PCI-to-host bridge (HB1) 540, and a second PCI-to-host bridge (HB2) 560. For purposes of illustration, a first and second peripheral device (Device A0 and Device $A_n$) are shown on PCI bus 525, and a first and second peripheral device (Device $B_0$ and Device $B_n$) are shown on PCI bus 575. The first PCI-to-host bridge (HB1) 540 and second PCI-to-host bridge (HB2) 560 preferably couple together via a host or processor bus 505.

In accordance with the preferred embodiment, a multicast bus 550 couples to each of the primary bus peripheral devices and to the PCI-to-Host bridge 540. In addition, sideband signals 535a–n couple between the peripheral devices on the primary bus 525 and the first PCI-to-host bridge (HB1) 540. Similar sideband signals 585a–n also couple between the secondary bus 575 and the second PCI-to-host bridge (HB2) 560. Sideband signals 555 also couple between the first PCI-to-host bridge (HB1) 540 and second PCI-to-host bridge (HB2) 560. A secondary multicast bus 552 connects to the PCI-to-Host bridge 560, and to each secondary bus peripheral device.

In the system of FIG. 5, any master device on either the first PCI bus 525 or the second PCI bus 575 may generate a multicast signal to multiple (or all) targets on either PCI bus. Thus, Device A may transmit a multicast signal that is intended for multiple targets, including targets on the second PCI bus 575. As was the case in FIG. 4, the data lines of the multicast bus 550 preferably identify the specific targets that are to receive the multicast signal. The PCI cycle then is accepted as a multicast cycle by the PCI-to-host bridge 540, based on appropriate signals appearing on sideband signals 535a–n. The first PCI-to-host bridge (HB1) 540 then converts the PCI cycle to a host cycle that is transmitted over the host or processor bus 505. In addition, the first PCI-to-host bridge 540 transmits sideband signals 555 to the second PCI-to-host bridge (HB2) 560, indicating a multicast cycle is being executed. The second PCI-to-host bridge (HB2) 560 then captures the data from the host bus 505, and re-converts the host cycle to a PCI cycle for transmitting on the second PCI bus 575. At the same time, the second PCI-to-host bridge (HB2) 560 transmits sideband signals 585a–n to the targets (or alternatively to all devices) on the second PCI bus 575 indicating that data for the multicast cycle is appearing on the second bus 575, for acceptance by all devices that have been identified as targets by the data signals on the secondary multicast bus 552.

It should be understood in the foregoing description of FIGS. 4 and 5 that cycles may be run from a master on the second bus to targets on the first bus. Thus, it is intended that the system operates reciprocally, and the bridges in FIGS. 4 and 5 support multicasting in either direction. In addition, it should be noted that the sideband signals may be included as part of the signals transmitted on the multicast bus. If the sideband signals are included in the multicast bus, then the bridges also should couple to the multicast bus to send and receive appropriate signals on the multicast bus.

Although the preferred embodiment of the apparatus and method of the present invention has been illustrated in the accompanying Drawings and described in the foregoing Detailed Description, it is understood that the invention is not limited to the embodiments disclosed, but is capable of numerous rearrangements, modifications and substitutions without departing from the spirit of the invention as set forth and defined by the following claims.

What is claimed is:

1. A computer system, comprising:
   a first computer bus connected to a first plurality of bus devices;
   a second computer bus connected to a second plurality of bus devices;
   a bridge coupling together said first computer bus and said second computer bus;
   a first multicast bus connecting to said first plurality of bus devices and a second multicast bus connecting to said second plurality of bus devices;
   wherein one of the first plurality of bus devices is capable of transmitting a multicast signal to at least two of said second plurality of bus devices, which are identified by a signal transmitted on said first multicast bus and said second multicast bus.

2. The system of claim 1, wherein the first plurality of bus devices are capable of transmitting a sideband signal to said bridge indicating a multicast cycle.

3. The system of claim 2, wherein the bridge relays the multicast cycle to said second computer bus in response to receipt of the sideband signal.

4. The system of claim 3, wherein said at least two of said secondary plurality of bus devices that are identified by a signal transmitted on the first and second multicast busses, each receive and decode the multicast cycle relayed by said bridge.

5. The system of claim 4, wherein said bridge also transmits a sideband signal to said second plurality of bus devices substantially simultaneously with relaying the multicast cycle.

6. The system of claim 5, wherein said first computer bus and said second computer bus comprise a PCI bus and said bridge comprises a PCI-to-PCI bridge.

7. The system of claim 2, wherein said bridge comprises a PCI-to-host bridge that connects to a host bus.

8. The system of claim 7, wherein said second computer bus comprises a second PCI bus, and a second PCI-to-host bridge couples said host bus to said second PCI bus.

9. The system of claim 8, wherein the first PCI-to-host bridge transmits a sideband signal to said second PCI-to-host bridge indicating a multicast cycle originating on said first PCI bus.

10. The system of claim 9, wherein in response to the sideband signal from said first PCI-to-host bridge, said second PCI-to-host bridge captures data transmitted on said host bus from said first PCI-to-host bridge.

11. The system of claim 10, wherein the second PCI-to-host bridge relays the data captured from the host bus onto the second PCI bus, and wherein said at least two of said secondary plurality of bus devices that are identified by a signal transmitted on the first and second multicast busses, each receive and decode the multicast cycle relayed by said second PCI-to-host bridge.

12. The system of claim 11, wherein said second PCI-to-host bridge also transmits a sideband signal to said second plurality of bus devices substantially simultaneously with relaying the multicast cycle.

13. The system of claim 1, wherein one of the second plurality of bus devices is capable of transmitting a multicast signal to at least two of said first plurality of bus devices, which are identified by a signal transmitted on said first and second multicast busses.

14. The system of claim 3, wherein the sideband signals are transmitted on the multicast busses.

15. The system of claim 12, wherein the sideband signals are transmitted on the multicast busses.

16. A method of transmitting a multicast signal between a device on a first bus to multiple targets on a second bus, and wherein the first bus and the second bus are coupled together by at least one bus bridge, comprising the acts of:

generating data on the first bus that is intended for multiple targets on the second bus;

identifying the multiple targets on the second bus via a target identification signal transmitted on a first and second multicast bus; and signaling the bridge that a multicast cycle has been initiated on the first bus;

relaying the data on the first bus to the second bus by the bridge;

indicating that data for a multicast cycle is appearing on the second bus; and capturing the multicast data at the targets identified by the target identification signal.

17. The method of claim 16, wherein the act of generating data on the first bus includes transmitting data on the first bus according to the protocol of the first bus.

18. The method of claim 16, wherein the act of signaling the bridge occurs via a sideband signal between the device generating the data and the bridge.

19. The method of claim 16, wherein the act of indicating the data for a multicast cycle is appearing on the second bridge occurs via a sideband signal between the bridge and devices resident on the second bus.

20. The method of claim 16, wherein the first bus and the second bus comprise PCI busses.

21. The method of claim 20, wherein the bridge comprises a PCI-to-PCI bridge.

22. The method of claim 20, wherein two bridges couple the PCI busses together.

23. The method of claim 22, wherein the two bridges are connected to a host bus.

24. The method of claim 23, wherein the two bridges comprise PCI-to-host bridges.

* * * * *

UNITED STATES PATENT AND TRADEMARK OFFICE
CERTIFICATE OF CORRECTION

Page 1 of 1

PATENT NO.         : 6,895,456 B2
APPLICATION NO.    : 09/735267
DATED              : May 17, 2005
INVENTOR(S)        : Sompong Paul Olarig et al.

It is certified that error appears in the above-identified patent and that said Letters Patent is hereby corrected as shown below:

On the title page, item (63), after "No." delete "09/203,093" and insert -- 09/203,083 --, therefor.

On the title page, item (63), after "Dec." delete "10" and insert -- 1 --, therefor.

In the Specification

In column 1, line 9, after "No." delete "09/203,093" and insert -- 09/203,083 --, therefor.

In column 1, line 9, after "Dec." delete "10" and insert -- 1 --, therefor.

Signed and Sealed this
Seventeenth Day of December, 2013

Margaret A. Focarino
*Commissioner for Patents of the United States Patent and Trademark Office*